United States Patent Office 3,505,337
Patented Apr. 7, 1970

3,505,337
N - HYDROCARBYL-SUBSTITUTED NORATROPIN-IUM, HALOALKYLATES AND O-ACYL DERIVATIVES THEREOF
Karl Zeile, Werner Schulz, Rolf Banholzer, and Helmut Wick, Ingelheim am Rhein, Germany, assignors to Boehringer Ingelheim G.m.b.H., Ingelheim am Rhein, Germany, a corporation of Germany
No Drawing. Filed Dec. 22, 1967, Ser. No. 692,697
Int. Cl. C07d 43/10; A61k 27/00
U.S. Cl. 260—292         7 Claims

ABSTRACT OF THE DISCLOSURE

The compounds are N-hydrocarbyl-substituted noratropinium-halo-alkylates and O-acyl derivatives thereof, useful as inhibitors of stomach acid secretion in warm-blooded animals, with a low inhibiting effect on the stomach juice secretion and furthermore as spasmolytics.

This invention relates to novel N-substituted noratropinium salts, as well as to a method of preparing these compounds.

More particularly, the present invention realtes to pharmaceutically acceptable N-substituted noratropinium salts of the formula

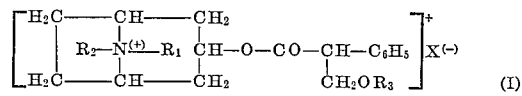

(I)

wherein:

$R_1$ is alkyl of 2 to 4 carbon atoms, alkenyl of 2 to 4 carbon atoms or cycloalkyl of 3 to 8 carbon atoms,
$R_2$ is alkyl of 1 to 4 carbon atoms, preferably methyl,
$R_3$ is hydrogen or acyl, preferably acetyl or benzoyl, and
$X^{(+)}$ the anion of a mono- or polyvalent acid, preferably of a hydrohalic acid.

The compounds according to the invention are prepared by reacting an N-substituted noratropine of the formula:

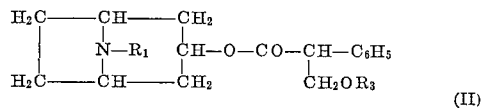

(II)

wherein $R_1$ and $R_3$ have the same meaning as in Formula I, with an alkylating agent of formula:

$$R_2-Y \qquad (III)$$

wherein $R_2$ has the meaning indicated above and Y is a radical easily removable as an anion, for example, halogen or the radical of a suitable sulfonic acid, such as toluene- or methane-sulfonic acid. If $R_3$ in Formula I is to be acyl, this acyl group may also be introduced subsequently into a compound of Formula I wherein $R_3$ is hydrogen, by acylating this compound with a conventional acylating agent, such as an acyl halide or acyl anhydride.

The quaternization reaction may be carried out in the presence of an organic inert solvent, such as acetonitrile, toluene, chloroform or acetone; however, it also proceeds without a solvent. The suitable temperature range lies between 0° C. and the boiling point of the particular reaction mixture.

Some of the starting compounds of Formula II have already been described by K. Nador et al. in J. Med. Pharm. Chem. 3 (1961), page 183, and Arzneimittelforschung 12 (1962), page 968. Those compounds of Formula II which have not yet been specifically described may be obtained as well by the method according to Nador (ibid), i.e. by reacting noratropine, itself obtainable by the Robinson-Schöpf condensation, with a compound of the formula $$R_1-Y \qquad (IV)$$

wherein $R_1$ and Y have the same meanings as in Formula I and III, respectively, and, optionally, subsequently acylating the reaction product with a conventional acylating agent. The compounds of Formula II possess useful therapeutic, especially central anticholinergic, properties; they may be obtained with good yield by re-esterification of an alkylester of formylphenyl acetate with a correspondingly N-substituted noratropine, subsequent reduction with a metal borohydride, and optional introduction of an acyl group $R_3$ into compounds of Formula II where $R_3$ is hydrogen with conventional acylating agents.

The optically active compounds of the Formula I may be obtained either by alkylation of an optically active starting compound of Formula II or by racemate separation with the aid of the customary auxiliary acids, such as dibenzoyl- or ditoluyl-D-tartaric acid or D-3-bromo-camphor-8-sulfonic acid.

If it is intended to convert the quaternary salts obtained by direct alkylation into salts with other anions, this may be achieved by double decomposition, i.e. by reacting a halide of Formula I with the corresponding silver salt. Suitable such silver salts are, for example, the formate, acetate, citrate, maleate, methanesulfonate, and 8-chloro-theophyllinate.

The compounds of Formula I are isomeric with the substances formed from atropine by alkylation [see German Patent 1,010,069 and Arzneimittelforschung 7 (1957), page 217], which is due to the known pseudo-asymmetry of the coordinatively tetravalent nitrogen atom. The structure of the quaternary salts of the Formula I is deduced from the literature [see J. A. Chem. Soc. 75 (1953), page 3204; J. Chem. Soc. 1956, page 14; and Chem. Ber. 88 (1955), page 1078] as well as from the rule of addition by G. Fodor derived therefrom.

The following examples further illustrate the present invention and will enable others skilled in the art to understand it more completely. It should be understood, however, that the invention is not limited solely to the particular examples given below.

EXAMPLE 1

Preparation of N-ethyl-noratropinium-bromo-methylate of the formula

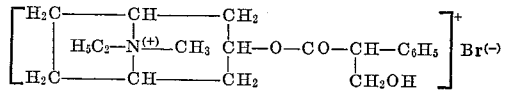

A solution of 3.03 gm. (0.01 mol) of N-ethyl-noratropine dissolved in 30 cc. of acetonitrile was admixed with a solution of 1.9 gm. (0.02 mol) of methyl-bromide in 10 cc. of acetonitrile, and the mixed solution was allowed to stand in a sealed round-bottom flask for three days at room temperature. Thereafter, the precipitated crystals were separated by vacuum filtration. From the mother liquor further quantities of the reaction product were isolated. Yield: 3.19 gm. (80.2% of theory). M.P. 193–195° C., white crystals from acetonitrile. Papyrogram up to 2000γ pure.

Analysis.— Calculated (percent): C, 57.285; H, 7.085; N, 3.516; Br, 20.063. Found (percent: C, 57.19; H, 7.08; N, 3.42; Br, 19.98.

EXAMPLE 2

N-ethyl-noratropinium-bromo-ethylate

A solution of 3.03 gm. (0.01 mol) of N-ethyl-noratropin in 30 cc. of acetonitrile was admixed with 2.18 gm. (0.02 mol) of ethylbromide and the mixture was refluxed for three days on a water bath. The precipitated crystals were separated by vacuum filtration and recrystallized from isopropanol. Yield: 2.7 gm. (65.5% of theory). M.P. 202–203° C., white crystals from isopropanol.

*Analysis.*—Calculated (percent): C, 58.249; H, 7.333; N, 3.397; Br, 19.38. Found (percent): C, 58.07; H, 7.41; N, 3.32; Br, 19.26.

EXAMPLE 3

N-ethyl-noratropinium-bromopropylate

A solution of 3.03 gm. (0.01 mol) of N-ethylnoratropine in 30 cc. of acetonitrile was admixtured with 2.46 gm. (0.02 mol) of propylbromide, and the mixture was allowed to stand for 14 days at 60° C. in a flask with a riser tube. The acetonitrile and excess propylbromide were then distilled off on a water bath in a water aspirator vacuum. Yield: 1.01 gm. (23.6% of theory). M.P. 194–196° C., yellowish crystals from acetonitrile. Papyrogram up to 2000γ pure.

*Analysis.*—Calculated (percent: C, 59.153; H, 7.565; N, 3.285; Br, 18.74. Found (percent): C, 59.38; H, 7.66; N, 3.11; Br, 18,73.

EXAMPLE 4

N-ethyl-noratropinium-bromobutylate

A solution of 3.03 gm. (0.01 mol) of N-ethyl-noratropine in 30 cc. of acetonitrile was admixed with 2.74 gm. (0.02 mol) of butylbromide, and the mixture was allowed to stand for 14 days at 60° C. in a flask with a riser tube. The reaction mixture was worked up as described in the previous examples. Yield: 2.2 gm. (50% of theory). M.P. 178–180° C., white crystals from isopropanol. Papyrogram up to 2000γ pure.

*Analysis.*— Calculated (percent): C, 59.993; H, 7.782; N, 3.181; Br, 18.145. Found (percent): C, 59.80; H, 7.81; N, 3.35; Br, 18.16.

EXAMPLE 5

N-propyl-noratropinium-bromomethylate

A solution of 3.17 gm. (0.01 mol) of N-propyl-noratropine in 30 cc. of acetonitrile was admixed with a solution of 9 gm. (0.02 mol) of methylbromide in 10 cc. of acetonitrile, and the mixture was allowed to stand in a sealed round-bottom flask for three days at room temperature. The reaction mixture was worked up as previously described. Yield: 2.37 gm. (57.5% of theory). M.P. 148–149° C., white crystals from benzene/ethylacetate.

*Analysis.*—Calculated (percent): C, 58.24; H, 7.33; N, 3.40; Br, 19.38. Found (percent): C, 58.16; H, 7.23; N, 3.45; Br, 19.62.

EXAMPLE 6

N-propyl-noratropinium-bromoethylate

A a solution of 3.17 gm. (0.01 mol) of N-propyl-noratropine in 30 cc. of acetonitrile was admixed with 2.18 gm. (0.02 mol) of ethylbromide, and the mixture was refluxed for three days on a water bath. Thereafter, the reaction mixture was worked up as previously described. Yield: 1.79 gm. (42% of theory). M.P. 238–240° C., white crystals from ethanol.

*Analysis.*—Calculated (percent): C, 59.284; H, 7.246; N, 3.296; Br, 18.786. Found (percent): C, 59.47; H, 6.92; N, 3.26; Br, 19.10.

Papyrogram up to 2000γ pure.

EXAMPLE 7

N-propyl-noratropinium-bromopropylate

A solution of 3.17 gm. (0.01 mol) of N-propyl-noratropine in 30 cc. of acetonitrile was admixed with 2.46 gm. (0.02 mol) of propylbromide, and the mixture was allowed to stand for 14 days at 60° C. in a flask with a riser tube. The reaction mixture was worked up as previously described. Yield: 1.93 gm. (43.8% of theory). M.P. 249–250° C., white crystals from ethanol.

*Analysis.*—Calculated (percent): C, 60.134; H, 7.572; Br, 18.186. Found (percent): C, 60.73; H, 7.81; Br, 17.88.

EXAMPLE 8

N-propyl-noratropinium-bromobutylate

A solution of 3.17 gm. (0.01 mol) of N-propyl-noratropine in 30 cc. of acetonitrile was admixed with 2.74 gm. (0.02 mol) of butylbromide, and the mixture was allowed to stand at 60° C. for 14 days in a flask with a riser tube. The reaction mixture was worked up as previously described. Yield: 1.99 gm. (43.8% of theory). M.P. 165–166° C., white crystals from acetonitrile/ethylacetate. Papyrogram up to 2000γ pure.

*Analysis.*—Calculated (percent): C, 60.91; H, 7.78; N, 3.09; Br, 17.624. Found (percent): C, 60.91; H, 7.97; N, 3.24; Br, 17.57.

EXAMPLE 9

N-isopropyl-noratropinium-bromomethylate 211.5 gm. (0.667 mol) of N-isopropyl-noratropine were dissolved at 60° C. in 2.11 liters of absolute toluene in a 3-liter glass pressure tube. While the solution was still warm, 95 gm. (1 mol) of ice-cold methylbromide were added, and the pressure tube was sealed immediately thereafter. The reaction mixture was kept at 60° C. for four days. After one hour of standing, the formation of crystals began. At the end of four days the crystals were separated by vacuum filtration at 60° C., washed wih 600 cc. of toluene at 60° C., and dried in vacuo in a drying cabinet at 100° C. Raw yield: 263.7 gm. (95.8% of theory). M.P. 224–225° C. (decomp.). Papyrogram: At 1000γ slight impurity. The raw product was refluxed with 2.5 liters of chloroform for 30 minutes, vacuum filtered while hot, washed with 200 cc. of chloroform, and dried in a vacuum drying cabinet at 100° C. Yield: 249 gm. (90.6% of theory). M.P. 226–228° C. (decomp.). Papyrogram up to 2000γ pure. The purified product was recrystallized from 1.2 liters of n-propanol, washed with 200 cc. of n-propanol and dried in a vacuum drying cabinet at 100° C. Yield: 237 gm. (86.15% of theory). M.P. 230–232° C. (decomp.). Papyrogram up to 2000γ pure. By evaporation of the mother liquor to 100 cc. another 6.0 gm. of the pure product, M.P. 230–231.5° C. (decomp.), were obtained. Papyrogram up to 2000γ pure. Total yield: 243 gm. (88.3% of theory).

EXAMPLE 10

N-cyclopropyl-noratropinium-bromomethylate of the formula

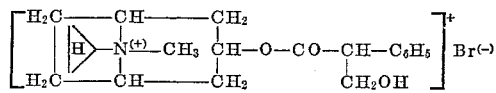

A solution of 3.15 gm. (0.01 mol) of N-cyclopropyl-noratropine in 30 cc. of acetonitrile was admixed with a solution of 1.9 gm. (0.02 mol) of methylbromide in 10 cc. of acetonitrile, the mixed solution was allowed to stand in a sealed round-bottom flask for three days at room temperature. The reaction mixture was worked up as previously described. Yield: 2.52 gm. (61.5% of theory). M.P. 121–123° C., white crystals from isopropanol. Papyrogram up to 2000γ pure.

EXAMPLE 11

N-cyclopropyl-noratropinium-bromoethylate

A solution of 3.15 gm. (0.01 mol) of N-cyclopropyl-noratropine in 30 cc. of acetonitrile was admixed with 2.18 gm. (0.02 mol) of ethylbromide, and the mixture was refluxed on a water bath for three days. The reaction mixture was worked up as previously described. Yield: 2.42 gm. (57% of theory). M.P. 202–203° C., white crystals from ethanol. Papyrogram up to 2000γ pure.

EXAMPLE 12

N-cyclopropyl-noratropinium-bromopropylate

A solution of 3.15 gm. (0.01 mol) of N-cyclopropyl-noratropine in 30 cc. of acetonitrile was admixed with 2.46 gm. (0.02 mol) of propylbromide, and the mixture was allowed to stand for 14 days at 60° C. in a flask with a riser tube. The reaction mixture was worked up as previously described. Yield: 1.85 gm. (42.3% of theory). M.P. 256° C., white crystals from methanol. Papyrogram up to 1000γ pure.

EXAMPLE 13

N-cyclopropyl-noratropinium-bromobutylate

A solution of 3.15 gm. (0.01 mol) of N-cyclopropyl-noratropine in 30 cc. of acetonitrile was admixed with 2.74 gm. (0.02 mol) of butylbromide, and the mixture was allowed to stand for 14 days at 60° C. in a flask with a riser tube. The reaction mixture was worked up as previously described. Yield: 2.79 gm. (61.6% of theory). M.P. 161–163° C., white crystals from acetone. Papyrogram up to 1000γ pure.

EXAMPLE 14

N-allyl-noratropinium-bromoethylate of the formula

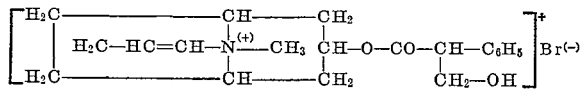

A solution of 3.15 gm. (0.01 mol) of N-allyl-noratropine in 30 cc. of acetonitrile was admixed with a solution of 1.9 gm. (0.02 mol) of methylbromide in 10 cc. of acetonitrile, and the mixed solution was allowed to stand in a sealed round-bottom flask for three days at room temperature. The reaction mixture was worked up as previously described. Yield: 2.52 gm. (61.5% of theory). M.P. 181–182° C., white crystals from acetonitrile. Papyrogram up to 2000γ pure.

EXAMPLE 15

N-allyl-noratropinium-bromoethylate

A solution of 3.15 gm. (0.01 mol) of N-allyl-noratropine in 30 cc. of acetonitrile was admixed with 2.18 gm. (0.02 mol) of ethylbromide, and the mixture was refluxed for three days on a water bath. The reaction mixture was worked up as previously described. Yield: 1.26 gm. (29.7% of theory). M.P. 221–222° C., white crystals from acetonitrile. Papyrogram up to 2000γ pure.

EXAMPLE 16

N-allyl-noratropinium-bromopropylate

A solution of 3.15 gm. (0.01 mol) of N-allyl-noratropine in 30 cc. of acetonitrile was admixed with 2.46 gm. (0.02 mol) of propylbromide, and the mixture was allowed to stand for 14 days at 60° C. in a flask with a riser tube. The reaction mixture was worked up as previously described. Yield: 2.36 gm. (54% of theory). M.P. 262–263° C., greyish crystals from ethanol. Papyrogram up to 2000γ pure.

EXAMPLE 17

N-allyl-noratropinium-bromobutylate

A solution of 3.15 gm. (0.01 mol) of N-allyl-noratropine in 30 cc. of acetonitrile was admixed with 2.74 gm. (0.02 mol) of butylbromide, and the mixture was allowed to stand for 14 days at 60° C. in a flask with a riser tube. The reaction mixture was worked up as previously described. Yield: 2.23 gm. (49.3% of theory). M.P. 162–165° C., greyish crystals from acetonitrile. Papyrogram up to 2000γ pure.

EXAMPLE 18

N-butyl-noratropinium-bromoethylate

A solution of 3.31 gm. (0.01 mol) of N-butyl-noratropine in 30 cc. of acetonitrile was admixed with a solution of 1.9 gm. (0.02 mol) of methylbromide in 10 cc. of acetonitrile, and the mixed solution was allowed to stand in a sealed round-bottom flask for three days at room temperature. The reaction mixture was worked up as previously described. Yield: 2.32 gm. (54.4% of theory). M.P. 163–165° C., yellowish crystals from isopropanol. Papyrogram up to 2000γ pure.

EXAMPLE 19

N-butyl-noratropinium-bromoethylate

A solution of 3.31 gm. (0.01 mol) of N-butyl-noratropine in 30 cc. of acetonitrile was admixed with 2.18 gm. (0.02 mol) of ethylbromide, and the mixture was refluxed for three days on a water bath. The reaction mixture was worked up as previously described. Yield: 2.82 gm. (64% of theory). M.P. 249–252° C., white crystals from methanol. Papyrogram up to 2000γ pure.

EXAMPLE 20

N-butyl-noratropinium-bromopropylate

A solution of 3.31 gm. (0.01 mol) of N-butyl-noratropine in 30 cc. of acetonitrile was admixed with 2.46 gm. (0.02 mol) of propylbromide, and the mixture was allowed to stand for 14 days at 60° C. in a flask with a riser tube. The reaction mixture was worked up as previously described. Yield: 2.94 gm. (64.8% of theory). M.P. 260° C., white crystals from methanol. Papyrogram up to 1000γ pure.

EXAMPLE 21

N-butyl-noratropinium-bromobutylate

A solution of 3.31 gm. (0.01 mol) of N-butyl-noratropine in 30 cc. of acetonitrile was admixed with 2.74 gm. (0.02 mol) of butylbromide, and the mixture was allowed to stand for 14 days at 60° C. in a flask with a riser tube. The reaction mixture was worked up as previously described. Yield: 2.94 gm. (62.8% of theory). M.P. 199–200° C., white crystals from acetonitrile. Papyrogram up to 500γ pure.

EXAMPLE 22

N-cyclohexyl-noratropinium-bromoethylate

A solution of 3.57 gm. (0.01 mol) of N-cyclohexyl-noratropine in 30 cc. of acetonitrile was admixed with a solution of 1.9 gm. (0.02 mol) of methylbromide in 10 cc. of acetonitrile, and the mixed solution was allowed to stand in a sealed round-bottom flask at room temperature for three days. The reaction mixture was worked up as previously described. Yield: 1.78 gm. (39.4% of theory). M.P. 218–220° C., white crystals from acetonitrile. Papyrogram up to 2000γ pure.

EXAMPLE 23

N-cyclohexyl-noratropinium-bromoethylate

A solution of 3.57 gm. (0.01 mol) of N-cyclohexyl-noratropine in 30 cc. of acetonitrile was admixed with 2.18 gm. (0.02 mol) of ethylbromide, and the mixture was refluxed on a water bath for three days. The reaction mixture was worked up as previously described. Yield: 1.79 gm. (38.4% of theory). M.P. 190–194° C., white cryslals from acetonitrile. Papyrogram up to 2000γ pure.

EXAMPLE 24

N-cyclooctyl-noratropinium-bromomethylate

A solution of 3.85 gm. (0.01 mol) of N-cyclooctyl-noratropine in 30 cc. of acetonitrile was admixed with a solution of 1.9 gm. (0.02 mol) of methylbromide in 10 cc. of acetonitrile, and the mixed solution was allowed to stand in a sealed round-bottom flask for three days at room temperature. The reaction mixture was worked up as previously described. Yield: 3.79 gm. (79% of theory). M.P. 188–190° C., white crystals from acetonitrile. Papyrogram up to 2000γ pure.

EXAMPLE 25

N-cyclooctyl-noratropinium-bromoethylate

A solution of 3.85 gm. (0.01 mol) of N-cyclooctyl-noratropine in 30 cc. of acetonitrile was admixed with 2.18 gm. (0.02 mol) of ethylbromide, and the mixture was refluxed on a water bath for three days. The reaction mixture was worked up as previously described. Yield: 1.9 gm. (38.4% of theory). M.P. 213–214° C., white crystals from acetonitrile. Papyrogram up to 2000γ pure.

EXAMPLE 26

N-cyclooctyl-noratropinium-bromopropylate

A solution of 3.85 gm. of N-cyclooctyl-noratropine in 30 cc. of acetonitrile was admixed with 2.46 gm. (0.02 mol) of propylbromide, and the mixture was allowed to stand for 14 days at 60° C. in a flask with a riser tube. The reaction mixture was worked up as previously described. Yield: 1.68 gm. (33.2% of theory). M.P. 218–220° C., white crystals from ethanol. Papyrogram up to 2000γ pure.

EXAMPLE 27

N-cyclooctyl-noratropinium-bromobutylate

A solution of 3.85 gm. of N-cyclooctyl-noratropine in 30 cc. of acetonitrile was admixed with 2.74 gm. (0.02 mol) of butylbromide, and the mixture was allowed to stand for 14 days at 60° C. in a flask with a riser tube. The reaction mixture was worked up as previously described. Yield: 1.05 gm. (20% of theory). M.P. 209–211° C., white crystals from acetonitrile. Papyrogram up to 2000γ pure.

EXAMPLE 28

N-butyl-nortropin-tropic acid ester-bromoethylate 4.5 gm. (0.0136 mol) of N-butyl-nortropine-tropic acid ester were admixed with 1.64 gm. (0.015 mol) of ethylbromide, and the mixture was allowed to stand in a sealed round-bottom flask for 48 hours at 60° C. The product which crystallized out was collected and recrystallized from methanol. Further quantities of the product were obtained by evaporation of the mother liquor. Yield: 1.6 gm. (26.6% of theory). M.P. 249–250° C. from methanol. Papyrogram up to 2000γ pure.

EXAMPLE 29

N-butyl-nortropin-tropic acid ester-bromopropylate 4.5 gm. (0.0136 mol) of N-butyl-nortropine-tropic acid ester were admixed with 1.85 gm. (0.015 mol) of propylbromide, and the mixture was allowed to stand in a sealed round-bottom flask for 48 hours at 60° C. The precipitated crystals were collected by vacuum filtration and recrystallized from methanol. Yield: 0.4 gm., M.P. 263–264° C. Papyrogram up to 2000γ pure.

EXAMPLE 30

N-isopropyl-pseudonortropin-tropic acid ester-bromomethylate

A solution of 5.0 gm. (0.016 mol) of N-isopropyl-pseudonortropine-tropic acid ester in 50 cc. of acetonitrile was admixed with a solution of 3.14 gm. (0.032 mol) of methylbromide in 10 cc. of acetonitrile, and the mixed solution was allowed to stand in a sealed round-bottom flask for 24 hours at room temperature. The precipitated crystals were collected by vacuum filtration. From the mother liquor further quantities of the compound were obtained by evaporation. Yield: 34.2% of theory. M.P. 212–214° C. (decomp.), white crystals from acetonitrile. Papyrogram up to 2000γ pure.

EXAMPLE 31

O-acetyl-N-isopropyl-nortropin-tropic acid ester-bromomethylate of the formula

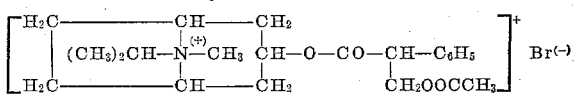

N - isopropyl-nortropine-tropic acid ester-hydrochloride, M.P. 196–198° C., was subjected to O-acetylation with acetic acid anhydride to form O-acetyl-N-isopropyl-nortropine-tropic acid ester-hydrochloride, M.P. 150–152° C., with a yield of 62% of theory. The acetylation product was reacted with methylbromide analgous to Example 5, whereby O-acetyl-N-isopropyl-nortropinium-tropic acid ester-bromomethylate, M.P. 208–210° C. (decomp.) was obtained with a yield of 60.2% of theory.

EXAMPLE 32

O-benzoyl-N-isopropyl-nortropin-tropic acid ester-bromomethylate

N-isopropyl-nortropine-tropic acid ester-hydrochloride was subjected to O-benzoylation with benzoyl chloride to form O-benzoyl-N-isopropyl-nortropine-tropic acid ester-hydrochloride, M.P. 178–179° C., with a yield of 60% of theory. The benzoylation product was reacted with methylbromide analogous to Example 5, whereby O-benzoyl-N-isopropyl-nortropinium-tropic acid ester-bromomethylate, M.P. 202° C. (decomp.) was obtained with a yield of 40% of theory.

The compounds according to the present invention, that is, racemic mixtures of those embraced by Formula I above and the optically active antipode components thereof, possess useful pharmacodynamic properties. More particularly, the compounds of the instant invention exhibit a strong inhibiting effect upon the stomach acid secretion coupled with a low inhibiting effect upon the stomach juice secretion and furthermore a spasmolytic activity in warm-blooded animals, such as mice and rats. In this respect the compounds of the present invention are significantly distinct from the isomers disclosed in German Patent 1,010,609 whose spasmolytic activity is particularly pronounced. Furthermore, the atropine-like side effects, such as mydriasis, are significantly reduced in the compounds of the present invention. Particularly effective as inhibitors of stomach acid secretion are those compounds of the Formula I, wherein $R_1$ is alkyl of 1 to 4 carbon atoms and $R_2$ is methyl, and especially N-isopropyl-noratropinium-bromomethylate.

The compounds according to the present invention were pharmacologically tested on laboratory mice and rats for stomach secretion inhibiting activity, spasmolytic activity and acute toxicity.

For determination of the stomach acid secretion inhibiting activity, the stomach juice secretion was cholinergically stimulated in a statistically significant number of adult laboratory rats, and then varying doses of N-isopropyl-noratropinium-bromomethylate were administered to the animals by intraduodenal injection. The secreted volume of stomach juice and its content of free hydrochloric acid were determined over a predetermined and uniform period of time. It was found that the volume of secreted stomach juice was reduced only to a minor degree over untreated control animals, whereas dosages of about 10 to 30 mgm./kg. practically completely inhibited the secretion of free hydrochloric acid. The other compounds embraced by Formula I above produced analogous results.

The median lethal dose ($LD_{50}$) per os of N-isopropyl-noratropinium-bromomethylate was found to be 2010 mgm./kg. in mice.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.0166 to 1.66 mgm./kg. body weight.

The following examples illustrate a few dosage unit compositions comprising a compound of the instant invention as an active ingredient and represent the best mode contemplated of putting the invention to practical use. The parts are parts by weight unless otherwise specified.

EXAMPLE 33

Hypodermic solution

The solution was compounded from the following ingredients:

| | Parts |
|---|---|
| N-isopropyl-noratropinium-bromomethylate | 10.0 |
| Dextrose | 47.0 |
| Tartaric acid | 0.012 |
| Double-distilled water q.s. ad 2000.0 parts by volume. | |

Compounding procedure

The noratropinium compound, the dextrose and the tartaric acid were dissolved in the freshly distilled water, the solution was filtered until free from suspended particles, and the filtrate was filled into 2 cc.-ampules under aseptic conditions. The filled ampules were subsequently sterilized for 20 minutes at 120° C. and then sealed. Each ampule contained 10 mgm. of the noratropinium compound, and when the contents of one ampule were administered by intravenous injection to a warm-blooded animal of about 60 kg. body weight in need of such treatment, very good stomach acid secretion inhibiting and spasmolytic effects were obtained.

EXAMPLE 34

Suppositories

The suppository composition was compounded from the following ingredients:

| | Parts |
|---|---|
| N-isopropyl-noratropinium-bromomethylate | 10.0 |
| Lactose | 100.0 |
| Cocoa butter | 1630.0 |
| Total | 1740.0 |

Compounding procedure

The cocoa butter was melted and then cooled to about 40° C., a mixture of the noratropinium compound and the lactose was stirred into the cocoa butter with the aid of an immersion homogenizer, and the homogeneous mixture was poured into cooled suppository molds, each holding 1740 mgm. of the mixture. Each suppository contained 10 mgm. of the noratropinium compound and, when administered by the rectal route to a warm-blooded animal of about 60 kg. body weight in need of such treatment, produced very good stomach acid secretion inhibiting and spasmolytic effects.

EXAMPLE 35

Coated pills

The pill core composition was compounded from the following ingredients:

| | Parts |
|---|---|
| N-isopropyl-noratropinium-bromomethylate | 5.0 |
| Dicalcium phosphate | 18.0 |
| Lactose | 13.9 |
| Corn starch | 27.0 |
| Colloidal silicic acid | 3.0 |
| Tartaric acid | 0.5 |
| Soluble starch | 2.0 |
| Stearic acid | 0.5 |
| Food color | 0.1 |
| Total | 80.0 |

Compounding procedure

The noratropinium compound was intimately admixed with the lactose, the corn starch, the silicic acid and the tartaric acid, the resulting mixture was moistened with an aqueous solution of the soluble starch, and the moist mass was granulated by passing it through a fine-mesh screen. The granulate was dried, admixed with the food color and the stearic acid, and the mixture was pressed into 80 mgm.-pill cores, which were subsequently coated with a thin shell consisting essentially of a mixture of titanium oxide, sugar, gum arabic, polyvinylpyrrolidone and talcum. Each coated pill contained 5 mgm. of the noratropinium compound and, when administered perorally to a warm-blooded animal of about 60 kg. body weight in need of such treatment, produced very good stomach acid secretion inhibiting and spasmolytic effects.

EXAMPLE 36

Drop solution

The solution was compound from the following ingredients:

| | Parts |
|---|---|
| N-isopropyl-noratropinium-bromomethylate | 100.0 |
| p-Hydroxy-benzoic acid methyl ester | 0.07 |
| p-Hydroxy-benzoic acid propyl ester | 0.03 |
| Ethanol (by volume) | 2000.0 |
| Demineralized water, q.s. ad 100,000. | |

Compounding procedure

The noratropinium compound was dissolved in the demineralized water, and the solution was admixed with a solution of the p-hydroxy-benzoic acid esters in the ethanol 1.0 ml. (20 drops) of the mixed solution contained 1.0 mgm. of the noratropinium compound and, when administered perorally to a warm-blooded animal of about 60 kg. body weight in need of such treatment, produced very good stomach acid secretion inhibiting and spasmolytic effects.

Although the above dosage unit composition examples illustrate only one compound of the present invention as an active ingredient, it should be understood that any other compound embraced by Formula I may be substituted for the particular noratropinium compound in Examples 33 through 36. Moreover, the amount of active ingredient in these examples may be varied to achieve the dosage unit range set forth above, and the amounts and nature of the inert pharmaceutical carrier ingredients may be varied to meet particular requirements. In addition, a dosage unit composition according to the present invention may also comprise one or more other active ingredients having the same spectrum of activity, such as aryl-aminoimidazolines, or other spectra of activity, such as spasmolytics of analogous structure or tranquilizers of the benzodiazepine, phenothiazine or carbamate type.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A racemic mixture of a noratropinium compound of the formula:

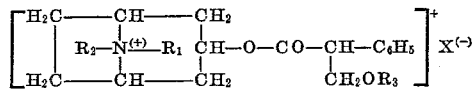

wherein:

$R_1$ is cycloalkyl of 3 to 8 carbon atoms,
$R_2$ is alkyl of 1 to 4 carbon atoms,
$R_3$ is hydrogen, acetyl or benzoyl with a proviso, that when $R_1$ represents cyclohexyl, $R_3$ is other than hydrogen, and
X is one equivalent of the anion of a mono- or polyvalent acid which forms non-toxic, pharmacologically acceptable salts, or an optically active antipode component of said racemic mixture.

2. A racemic mixture of a noratropinium compound of the formula:

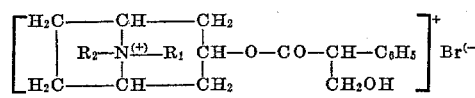

wherein:

$R_1$ is cyclopropyl or cyclooctyl, and
$R_2$ is alkyl of 1 to 4 carbon atoms, or an optically active antipode component of said racemic mixture.

3. A compound as in claim 1, wherein $R_1$ is cyclohexyl and $R_2$ is methyl.
4. A compound as in claim 2, wherein $R_1$ is cyclooctyl and $R_2$ is methyl.
5. A compound as in claim 2, wherein $R_1$ is cyclooctyl and $R_2$ is ethyl.
6. A compound as in claim 2, wherein $R_1$ is cyclooctyl and $R_2$ is n-propyl.
7. A compound as in claim 2, wherein $R_1$ is cyclooctyl and $R_2$ is n-butyl.

References Cited

UNITED STATES PATENTS 2,734,062   2/1956   Hotovy et al. _____ 260—292
3,178,436   4/1965   Vecchi et al. _____ 260—292

OTHER REFERENCES

Auslegeschrift No. 1,165,037, published Mar. 12, 1964, Germany, 260/292.

Nador et al., Journal of Medicinal and Pharmaceutical Chemistry, vol. 3, No. 1, pp. 183–5 (1961).

Burger, Medicinal Chemistry, Second Edition, Interscience, pp. 465–7 and 471.

HENRY R. JILES, Primary Examiner

A. L. ROTMAN, Assistant Examiner

U.S. Cl. X.R.

424—265

UNITED STATES PATENT OFFICE
CERTIFICATE OF CORRECTION

Patent No. 3,505,337                  April 7, 1970

Karl Zeile et al.

It is certified that error appears in the above identified patent and that said Letters Patent are hereby corrected as shown below:

Column 1, in the Title, omit the comma after "NORATROPINIUM". Column 10, line 39, after "water" insert -- (by volume) --; line 46, after "ethanol" insert a period.

Signed and sealed this 29th day of September 1970.

(SEAL)
Attest:

Edward M. Fletcher, Jr.            WILLIAM E. SCHUYLER, JR.
Attesting Officer                    Commissioner of Patents

UNITED STATES PATENT OFFICE
CERTIFICATE OF CORRECTION

Patent No. 3,505,337                 Dated April 7, 1970

Inventor(s) Karl Zeile et al.

It is certified that error appears in the above-identified patent and that said Letters Patent are hereby corrected as shown below:

Column 1, line 9, insert -- Claims priority, application Germany, Dec. 28, 1966, B 90 502 --.

Signed and sealed this 3rd day of November 1970.

(SEAL)
Attest:

EDWARD M. FLETCHER, JR.
Attesting Officer

WILLIAM E. SCHUYLER, JR.
Commissioner of Patents